United States Patent [19]
Besser

[11] Patent Number: 6,147,337
[45] Date of Patent: Nov. 14, 2000

[54] MICROWAVEABLE HEAT RETENTIVE RECEPTACLE

[75] Inventor: John E. Besser, Franklin, Tenn.

[73] Assignee: Aladdin Industries, LLC, Nashville, Tenn.

[21] Appl. No.: 09/208,493

[22] Filed: Dec. 10, 1998

[51] Int. Cl.[7] ........................................................ H05B 6/80
[52] U.S. Cl. ........................ 219/730; 219/759; 219/732; 99/DIG. 14; 426/107; 426/234; 126/375
[58] Field of Search .................................. 219/730, 732, 219/759, 734, 758; 99/DIG. 14; 126/375, 390, 246; 426/107, 109, 234, 241, 243

[56] References Cited

U.S. PATENT DOCUMENTS

| | | |
|---|---|---|
| Re. 34,929 | 5/1995 | Kristen . |
| 1,503,762 | 8/1924 | Mock . |
| 2,640,478 | 6/1953 | Flournoy . |
| 2,690,743 | 10/1954 | Flournoy . |
| 3,094,448 | 6/1963 | Cornelius . |
| 3,120,570 | 2/1964 | Kennedy et al. . |
| 3,155,260 | 11/1964 | Widener . |
| 3,256,101 | 6/1966 | Arns . |
| 3,331,522 | 7/1967 | Bridges . |
| 3,387,650 | 6/1968 | Hoffmann et al. . |
| 3,603,106 | 9/1971 | Ryan et al. . |
| 3,684,123 | 8/1972 | Bridges . |
| 3,807,194 | 4/1974 | Bond . |
| 3,910,441 | 10/1975 | Bramming . |
| 3,941,967 | 3/1976 | Sumi et al. . |
| 4,182,398 | 1/1980 | Salyer et al. . |
| 4,182,405 | 1/1980 | Hysen et al. . |
| 4,182,457 | 1/1980 | Yamada et al. . |
| 4,183,435 | 1/1980 | Thompson et al. . |
| 4,184,601 | 1/1980 | Stewart et al. . |
| 4,217,161 | 8/1980 | Yamada et al. . |
| 4,246,884 | 1/1981 | Vandas . |
| 4,258,695 | 3/1981 | McCarton et al. . |
| 4,259,198 | 3/1981 | Kreibich et al. . |
| 4,304,106 | 12/1981 | Donnelly . |
| 4,316,070 | 2/1982 | Prosise et al. . |
| 4,319,629 | 3/1982 | Hotta . |
| 4,327,136 | 4/1982 | Thompson et al. . |
| 4,357,809 | 11/1982 | Held et al. . |
| 4,360,607 | 11/1982 | Thorsrud et al. . |
| 4,383,422 | 5/1983 | Gordon et al. . |
| 4,462,224 | 7/1984 | Dunshee et al. . |
| 4,466,553 | 8/1984 | Zenger . |
| 4,518,651 | 5/1985 | Wolfe, Jr. . |
| 4,567,877 | 2/1986 | Sepahpur . |
| 4,572,864 | 2/1986 | Benson et al. . |
| 4,617,332 | 10/1986 | Salyer et al. . |
| 4,685,588 | 8/1987 | Kobayashi . |
| 4,702,853 | 10/1987 | Benson et al. . |
| 4,704,510 | 11/1987 | Matsui . |
| 4,711,813 | 12/1987 | Salyer . |
| 4,714,445 | 12/1987 | Templeton . |
| 4,756,311 | 7/1988 | Francis, Jr. . |
| 4,765,393 | 8/1988 | Baxter . |
| 4,768,354 | 9/1988 | Barnwell . |
| 4,795,649 | 1/1989 | Kearns et al. . |
| 4,819,612 | 4/1989 | Okamoto et al. . |
| 4,888,459 | 12/1989 | Keffer . |

(List continued on next page.)

OTHER PUBLICATIONS

Zubay, Geoffrey "Chapter 5: Lipids" in Biochemistry Second Edition, Macmillan Publishing Company, 1988, pp. 154–175.

Battelle Solutions Update entitled, "Solutions Profile" from "http://www.batelle.org/solutions/profile. html", Dec. 28, 1996.

*Primary Examiner*—Teresa Walberg
*Assistant Examiner*—Jeffrey Pwu
*Attorney, Agent, or Firm*—Greenblum & Bernstein, P.L.C.

[57] ABSTRACT

Microwaveable heat retentive receptacles comprising a volume for receiving a product, in heat exchange communication with a microwave absorbing material, wherein the microwave absorbing material preferably comprises polyesters. Pouches containing the microwave absorbing material are also provided which can be associated with containers to provide improved heat storage characteristics.

41 Claims, 9 Drawing Sheets

6,147,337
Page 2

U.S. PATENT DOCUMENTS

| | | |
|---|---|---|
| 4,889,302 | 12/1989 | Tucker . |
| 4,900,886 | 2/1990 | Bridges . |
| 4,920,964 | 5/1990 | Francis, Jr. . |
| 4,937,412 | 6/1990 | Dobry . |
| 4,982,722 | 1/1991 | Wyatt . |
| 4,983,798 | 1/1991 | Eckler et al. . |
| 5,004,121 | 4/1991 | Howe . |
| 5,045,330 | 9/1991 | Pawlowski . |
| 5,049,714 | 9/1991 | Beresniewicz et al. . |
| 5,052,369 | 10/1991 | Johnson . |
| 5,053,446 | 10/1991 | Salyer . |
| 5,070,223 | 12/1991 | Colasante . |
| 5,076,463 | 12/1991 | McGraw . |
| 5,091,231 | 2/1992 | Parkinson . |
| 5,094,706 | 3/1992 | Howe . |
| 5,106,520 | 4/1992 | Salyer . |
| 5,107,087 | 4/1992 | Yamada et al. . |
| 5,124,519 | 6/1992 | Roy et al. . |
| 5,125,391 | 6/1992 | Srivastava et al. . |
| 5,144,106 | 9/1992 | Kearns et al. . |
| 5,145,090 | 9/1992 | Wyatt . |
| 5,205,277 | 4/1993 | Chao-Tsung . |
| 5,211,949 | 5/1993 | Salyer . |
| 5,220,141 | 6/1993 | Quick et al. . |
| 5,241,149 | 8/1993 | Watanabe et al. . |
| 5,241,150 | 8/1993 | Garvey et al. . |
| 5,252,793 | 10/1993 | Woods . |
| 5,254,380 | 10/1993 | Salyer . |
| 5,282,994 | 2/1994 | Salyer . |
| 5,294,763 | 3/1994 | Chamberlain et al. . |
| 5,314,005 | 5/1994 | Dobry . |
| 5,329,778 | 7/1994 | Padamsee . |
| 5,403,998 | 4/1995 | Sheen et al. . |
| 5,414,248 | 5/1995 | Phillips ................................. 219/730 |
| 5,416,305 | 5/1995 | Tambellini . |
| 5,417,276 | 5/1995 | Dobry . |
| 5,421,473 | 6/1995 | McCrossen . |
| 5,424,519 | 6/1995 | Salee . |
| 5,454,471 | 10/1995 | Norvell . |
| 5,478,988 | 12/1995 | Hughes et al. . |
| 5,494,598 | 2/1996 | Hughes . |
| 5,508,498 | 4/1996 | Rheinish et al. . |
| 5,513,629 | 5/1996 | Johnson . |
| 5,515,995 | 5/1996 | Allen et al. . |
| 5,520,103 | 5/1996 | Zielinski et al. . |
| 5,560,856 | 10/1996 | Dobry . |
| 5,573,693 | 11/1996 | Lorence et al. . |
| 5,596,921 | 1/1997 | Kuwana et al. . |
| 5,601,744 | 2/1997 | Baldwin . |
| 5,603,858 | 2/1997 | Wyatt et al. . |
| 5,679,278 | 10/1997 | Cox ...................................... 219/730 |
| 5,916,470 | 6/1999 | Besser et al. ......................... 219/730 |

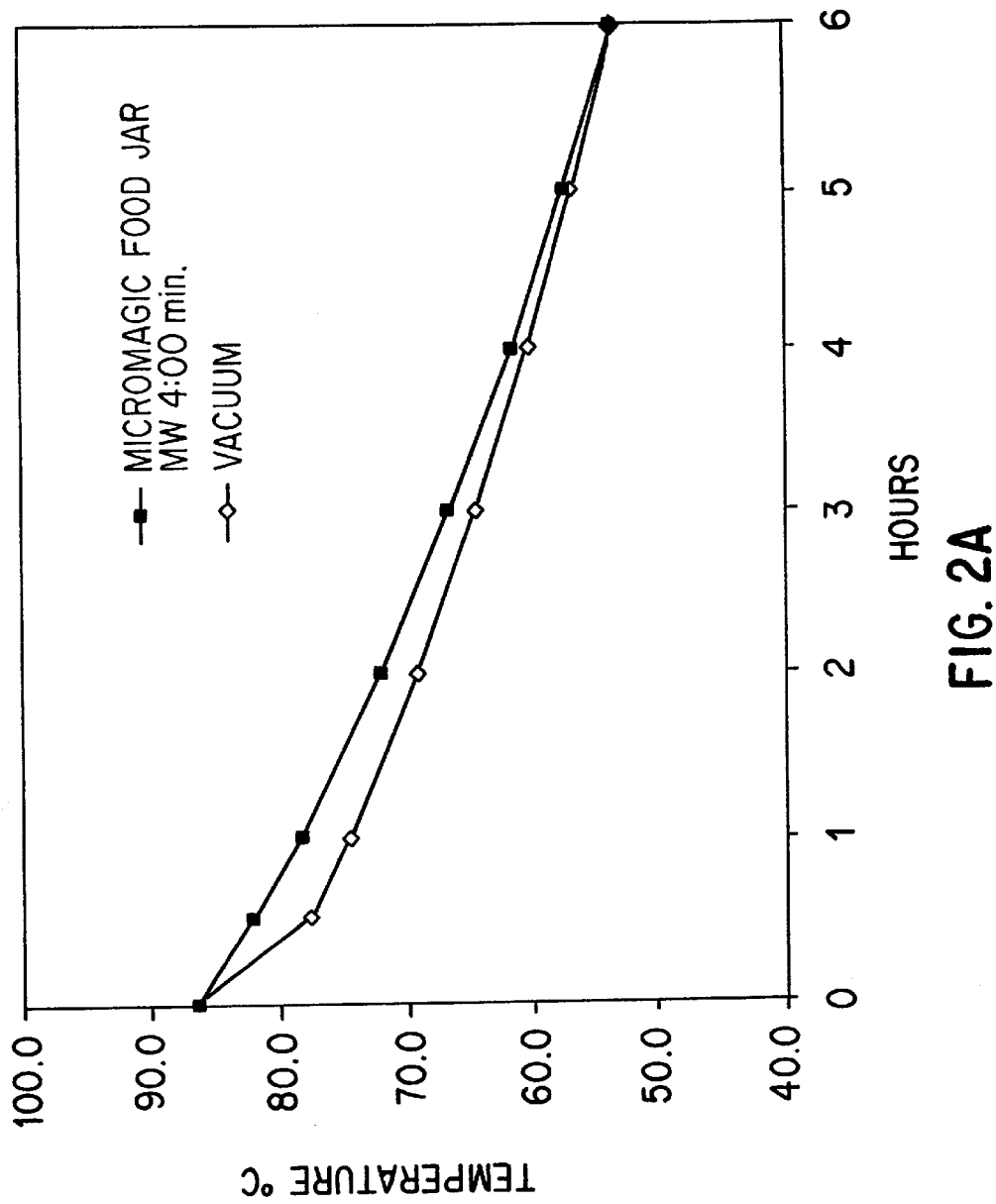

MICROWAVEABLE HEAT RETENTIVE RECEPTACLE

BACKGROUND OF THE INVENTION

1. Field of the Invention

This invention relates to microwaveable thermodynamic receptacles, containers, and warming modules. More specifically, this invention relates to containers adapted to maintain their contents at elevated temperatures for extended periods of time. Thermodynamic containers of this invention include a microwave-absorbing composition in heat exchange relationship with the container contents and preferably in a space defined by inner and outer walls of the container. Upon exposure to microwave energy, the composition absorbs energy in the form of microwaves, which is retained in the composition in the form of thermal energy. The thermal energy can then be transferred into the contents of the container, such as a food or beverage, thereby maintaining the contents at an elevated temperature for an extended period of time.

2. Background of the Invention and Related Art

Maintaining the temperature of a food or beverage after cooking or preheating has long been of interest in food and beverage service. In domestic, recreational, field, and commercial environments (among others), maintenance of temperature is desirable when the food or beverage is served some time after cooking or preheating. For example, in commercial environments, food service pans are often placed over a tray of boiling water or over some other heating means to maintain the temperature of the food after preparation. In the home, it is common for a casserole dish to be placed into a wicker basket or wrapped in a cloth towel to insulate the container and maintain the desired temperature of the contents. For the same purpose, electrically heated trivets, or preheated hot-pads, are sometimes used.

Additionally, it is often desirable to be able to consume a food or beverage, prepared earlier, at some location removed from the home, such as at the workplace. In these circumstances, it is often desirable to place food into a portable container which can be easily carried to a separate location where the food can later be consumed. In some environments, such as in remote wilderness locations, or at some sporting events, it can be impossible or impractical to reheat the food or beverage prior to consumption. In these instances, it is both pleasing and convenient to open the container at some later period and find that the food or beverage has been maintained at a desirable temperature.

Portable containers which serve this purpose have been known for years. Early containers designed for this purpose include bottles or other containers, insulated with a foam insulation such as foamable foam polystyrene, e.g., STYROFOAM, or foam polyurethane. Although these containers extend the time a food or beverage may be maintained at an elevated temperature, they do not provide the level of temperature maintenance desired in many instances.

Foam insulated beverage containers have been known for years. A recent advance in double walled foam insulated beverage containers is disclosed in U.S. Pat. No. 5,515,995, to ALLEN et al. This patent discloses a double walled, foam insulated beverage container having a wide base. This patent, and U.S. Pat. No. 3,684,123, to BRIDGES, cited therein, are hereby incorporated by reference as though set forth in full herein.

In general, vacuum insulated bottles are far superior to those insulated with foam. U.S. Pat. No. 3,331,522, to BRIDGES, which is hereby incorporated by reference as though set forth in full herein, describes a vacuum insulated bottle comprising a metal vacuum bottle enclosed in a plastic jacket.

To enhance the ability of the vacuum bottle itself to insulate, attempts have been made to utilize different materials for the vacuum bottle. Although fragile, glass is superior to metal in its lack of thermal conductivity, and thus glass vacuum containers became popular for use in thermally insulated containers.

To further enhance the insulating properties of the glass vacuum container, attempts have been made to line glass vacuum containers with reflective coatings to minimize radiant heat loss. U.S. Pat. No. 3,910,441, to BRAMMING, is illustrative, and discloses a glass vacuum bottle construction in which the interior walls are silver-coated to reduce heat loss.

With the advent of microwave cooking technology and its rapid acceptance and popularity, the need arose for a thermally insulated bottle which could also be used in a microwave oven. However, because metals absorb significant microwave energy, they can become dangerously hot in a microwave oven. Additionally, reflective metals and coatings containing such metals, e.g., silver, can damage the microwave oven magnatron tube by reflecting microwave energy back into the wave guide, and by "arcing" and/or sparking.

A number of attempts have been made at solving the aforementioned problem. For example, U.S. Pat. No. 4,184,601, to STEWART et al., which is hereby incorporated by reference as though set forth in full herein, relates to a microwave-safe vacuum insulated glass container. Instead of a silver lining to reduce radiant heat loss, the annular space of the glass container is substantially filled with finely divided materials which are neither electrically conductive nor absorbent of electromagnetic energy at microwave frequencies. Examples of such materials include finely divided silica and calcium carbonate.

While the vacuum containers which are known in the art are certainly able to conserve the heat of their contents, a continuing need for improvement remains. Most commercially-available vacuum containers known in the art allow a significant loss of thermal energy at a measurable rate (heat loss/unit of time, i.e., thermal efficiency). A need therefore exists for improved thermal efficiency in a microwaveable container.

The present invention enhances the ability of the thermally insulated container to maintain contents at elevated temperatures. Conventional vacuum insulated containers are designed to conserve the thermal energy already present in the contents of the container. The present invention, on the other hand, actually transfers thermal energy into the contents, adding to the thermal energy of the contents, and thereby keeping the contents at a higher temperature for extended periods of time.

The concept of a container which can be preheated to add thermal energy to the contents is not new. For example, U.S. Pat. No. 4,567,877, to SEPAHPUR, discloses a heat storage food container, adapted to be used in microwave ovens, using wet sand as a thermal storage medium. However, an obvious drawback to the SEPAHPUR container is that water undergoes a phase transition (from liquid to gas—vaporization) upon heating in the temperature range necessary for food preparation. Upon the phase change from liquid to gas, the molecules occupy a significantly greater volume, and consequently, the heat storage container must be engineered to structurally accommodate such changes.

The vaporization problem is addressed in BALDWIN, U.S. Pat. No. 5,601,744, which discloses a beverage container comprising an inner vessel with bottom and side walls, an outer wall at least practically surrounding the inner vessel, a chamber defined by the space between the inner vessel and the outer wall, and a microwave receptive material disposed within the chamber. Either or both of the inner vessel or the outer wall are transparent to microwave radiation and has a melting point greater than a melting temperature, and less than a vaporization temperature, of the microwave receptive material. Thus, the container is designed to melt before pressure is allowed to build within the closed space containing the microwave receptive material.

In addition to problems caused by vaporization, problems are also created when microwave susceptible materials undergo phase changes from solid to liquid. In these cases, it is necessary to engineer the container and/or material so as to contain the microwave susceptible material upon melting. ZIELINSKI et al., U.S. Pat. No. 5,520,103, discloses a heat retentive server comprising upper and lower shells, which include a thermoplastic material and are joined together to define a cavity therebetween. A heat storage medium comprising a phase-change material substantially fills the cavity and is unrestrained therein. The melting problem is addressed in ZIELINSKI et al. by use of a material which forms a gel at elevated temperatures.

Commonly assigned co-pending U.S. application Ser. No. 08/781,630, filed Jan. 10, 1997, discloses microwaveable heat retentive receptacles utilizing microwave absorbing materials. This application is hereby incorporated by reference as though set forth in full herein.

Containers for use in microwave ovens such as that disclosed in U.S. application Ser. No. 08/781,630 are formed from polymers and are substantially transparent to microwave radiation. By "substantially transparent to microwave radiation" herein is meant that an object formed of such a material and subjected to microwave radiation of about 1000 watts for a period of about 2 minutes will exhibit a change in temperature of about 5° F. or less. Typical materials meeting this definition include polyolefins, e.g., polyethylene and polypropylene.

DOBRY, U.S. Pat. No. 4,937,412, discloses a method of heating a load object comprising the steps of using a microwave susceptible material which is fluid at a predetermined elevated operating temperature, enclosing the material in a means of containment, exposing the material to microwave radiation to generate heat and store it in the material and in the means of containment, and placing a load object in proximity to the means of containment. The means of containment may be either closed and flexible, or porous and permeable. If the latter, then the microwave susceptible material is held therein by capillary action.

U.S. Pat. No. 5,052,369, to JOHNSON, which is hereby incorporated by reference as though set forth in full herein, also discloses a heat retaining food container adapted for microwave use. Unlike SEPAHPUR, the microwave absorbing material of JOHNSON is a mixture of micro crystalline wax which exhibits a fusion temperature (melting point) between 175° F. and 300° F. The melted material is contained by the use of a thin film or a pouch-like enclosure.

Others have addressed the melt-containment problem by using materials that do not undergo a solid to liquid transition at higher temperatures. For example, U.S. Pat. No. 4,983,798, to ECKLER et al., discloses the use of materials which undergo a "mesocrystalline" phase change in the solid state prior to melting, such as pentaerythritol and neopentylglycol. ECKLER et al. is hereby incorporated by reference as though set forth in full herein.

BENSON et al., U.S. Pat. No. 4,572,864, discloses a composite material for storage of heat energy. The material comprises a polyhydric alcohol or derivative which is capable of undergoing a solid-state crystalline phase transformation. Such materials include pentaerythritol, pentaglycerine, neopentyl glycol, tetramethylol propane, monoamino pentaerythritol, diamino pentaerythritol, tris (hydroxymethyl)acetic acid, and mixtures thereof. The composite material also comprises materials from the group which includes metals, plastics, natural or artificial fibers, and porous rock. Also disclosed is a method of impregnating the phase-change materials into certain solid substances, including porous, fibrous, and stone-like materials.

CHAMBERLAIN et al., U.S. Pat. No. 5,294,763, discloses a heat susceptor comprising microwaveable heat susceptor particles in a matrix which is substantially non-reflective (i.e., "capable of transmitting microwave energy") to microwave energy. The particles comprise substrates which, like the matrix, are non-reflective of microwave energy. The particle substrates are coated with a material capable of absorbing microwave energy and converting it to heat. Materials for the matrix include ceramics and polymers. Materials for the substrate include glass and ceramics. Coating materials include electrically conductive and semi-conductive materials, such as metals and metal-containing compounds.

KREIBICH et al., U.S. Pat. No. 4,259,198, discloses a method of using crystalline resins as heat accumulators. The crystalline synthetic cross-linked resins used, which include polyester resins, further include crystallite-forming blocks linked to the resin through ether or ester linkages. The crystallite forming blocks comprise polymethylene chains which alternate with ether or ester linkages, and have at least thirty carbon atoms.

Commercially available standard microwave ovens for domestic use in the home typically are rated as having an "output" of, for example, on the order of from about 600 to about 1,000 watts. Typical commercial "convenience" foods are specifically designed to be heated to or near a desired or serving temperature (e.g., perceived to be desirable by the typical adult) in from about 2 to about 6 minutes. Consequently, it is believed that typical users of microwave ovens in domestic settings desire or expect to employ a microwave oven to heat the contents of a container to a desired serving temperature in a period of time of from about 2 to about 6 minutes.

SUMMARY OF THE INVENTION

In view of the foregoing, the present invention is directed to providing a microwave heatable component comprising a microwave heatable material which exhibits a desirable response to microwave radiation and which may act as a thermal battery.

The present invention is further directed to providing articles which employ such materials and which can thereby be kept warm by exposure of such materials to microwave radiation.

The present invention is further directed to providing containers which employ such materials and whose contents can thereby be kept warm by exposure of such materials to microwave radiation.

The present invention is also directed to providing such a container wherein the container can be heated either with or without the contents of food therein and still function as a thermal battery in either case to reduce the net loss of heat from the contents.

It is also within the scope of the present invention to provide a container wherein the container can be heated by microwave energy either with or without the contents of food therein during a period of time which is acceptable to, and in fact expected by domestic users, and still function as a thermal battery, to absorb microwave energy, and to reduce the net loss of heat from the contents, while at the same time avoiding overheating of components of the container, such as by overheating of the microwave susceptible portion of the container.

The present invention is still further directed to providing a microwaveable container which maintains the temperature of its contents at a higher temperature over time than other commercially available containers.

The present invention is directed to providing a microwaveable container which contains a microwave-absorbing material which, when exposed to microwave energy, heats at an optimum rate to an acceptable temperature without causing damage to the surrounding container.

The present invention is further directed to providing a microwaveable container which contains a microwave-absorbing material which is solid at room temperature and remains in a solid phase upon heating to about 300° F., preferably at least about 400° F. An advantage of such a material is that the container itself need not be specially engineered to accommodate a phase change, either to liquid or to gas (from solid, for example).

The present invention is still further directed to providing a microwaveable container which contains a microwave-absorbing material which is inherently "microwave active," or "microwave responsive" and does not require the presence of another material, such as water. An advantage of such a material is that it does not lose moisture and "dry out" with repeated microwaving. Consequently, the lifetimes of the microwaveable pouch and container are significantly increased. Moreover, the material can be simply and easily used in the container with reduced manufacturing costs.

The present invention is directed to providing a microwaveable container which radiates thermal energy into its contents, thereby allowing the contents to be maintained at a higher temperature than possible with a comparable vacuum container, yet is thermally insulated on the exterior, preventing outward radiant heat loss.

The present invention is further directed to providing a portable thermally insulated bottle which can be heated in a typical microwave oven available to consumers prior to receiving its heated contents, and thereby maintain the heated contents at an acceptable temperature.

The present invention is directed to providing serving containers, such as bowls or serving dishes, for home or commercial use, which can be microwaved prior to receiving their contents, and thereby maintain their contents at a higher temperature, in comparison with other commercially available containers.

The present invention is directed to providing serving containers, such as carafes or pots, for home use, which can be microwaved prior to receiving their contents, and thereby maintain a higher temperature of the contents, in comparison with other commercially available containers.

The present invention is further directed to providing a microwaveable composition which heats easily upon microwave energy absorption, yet does not substantially overheat if overmicrowaved, and yet further, exhibits a thermal capacity sufficient to change the shape of the thermal loss curve compared to containers lacking such compositions, and still further, is nontoxic if exposed to the consumer.

The present invention is still further directed to providing a microwaveable heat storage container constructed from durable materials (without the glass vacuum container), which is thereby more useful to the consumer.

The present invention is further directed to providing a modular unit comprising a microwaveable composition which can be used instead of, or in addition to, the vacuum insulation in thermally insulated containers.

The present invention is still further directed to providing a modular unit comprising a microwaveable composition which can be used in medical applications for warming parts of a body.

The present invention is further directed to providing a modular unit comprising a microwaveable composition which can be used in clothing to be worn in cold weather, to aid in warming a body.

These and other objects of the invention are achieved by providing a microwaveable material which exhibits desirable properties in response to microwave radiation.

These objects have been achieved by providing articles which employ such materials and which can thereby be kept warm by exposure of such materials to microwave radiation.

These objects have been achieved by providing containers which employ such materials and whose contents can thereby be kept warm by exposure of such materials to microwave radiation.

These objects are also achieved by the provision of a microwaveable container including an inner shell adapted to receive a food or beverage product, an outer shell enveloping the inner shell and forming a cavity therebetween, and a microwave-absorbing composition contained in the cavity between the inner and outer shell.

The microwave absorbing material is preferably disposed within a microwave absorbing material storage volume, which can be of various shapes such as substantially planar, substantially disk-shaped, substantially tubular, annular, or it may be disposed at a bottom portion of the container, and preferably in association with a bottom wall portion of the container. The microwave absorbing material storage volume can preferably comprise a pouch.

The microwaveable heat retentive container wall portion can include a cavity and the microwave absorbing material is preferably disposed within the cavity.

In other aspects, a microwaveable heat retentive container for heated foods or beverages, is provided comprising an outer shell, an inner wall positioned within the outer shell, and a material susceptible to heating by microwave radiation, the material having a time/temperature profile such that, when from about 20 to about 150 grams of the material, preferably from about 25 to about 100 grams, more preferably from about 30 to about 80 grams, and most preferably about 60 grams, is subjected to microwave radiation. Preferably, the radiation is at a frequency of from approximately 2,300–2,600 MHz, more preferably 2,400–2,500 MHz, most preferably 2,450 MHz. Preferably the microwave power is from approximately 600–1,000 W, more preferably 750–1,000 W. Preferably, the time of heating in the microwave oven is from about 1 to about 3 minutes, more preferably from about 1.25 to about 2.5 minutes, more preferably from about 1.5 to about 2.25 minutes. Under such conditions, the material is heated to a temperature of from about 175° F. to about 320° F., more preferably from about 190° F. to about 275° F., and most preferably from about 200° F. to about 250° F.

Preferably the outer shell is substantially microwave transparent (as defined above) and can comprise polypropylene. As above, the material susceptible to heating by microwave radiation is preferably contained within a pouch, as described above. Preferably the inner shell is substantially microwave transparent and preferably comprises polypropylene.

In the foregoing embodiments, the cavity in the container wall portion further comprises an insulating means to reduce outward radiant heat loss, which can include, an evacuated space, insulating foam material, such as polyurethane foam, polystyrene foam, etc.

In other aspects, these objects are attained by providing a microwaveable heat retentive container comprising at least one portion for receiving a material, and defining a volume; and a mass of microwave absorbing material in heat exchange communication with the at least one portion for receiving a material.

In certain preferred aspects the invention provides a microwaveable heat retentive container comprising
at least one portion for receiving a material; and
a heat storage mass comprising a microwave absorbing material in heat exchange communication with the at least one portion, the microwave absorbing material comprising at least one polymeric resin having a melting point of at least 400° F., and comprising repeating units having at least one nitrogen, oxygen, or sulfur atom. In such embodiments, the polymeric resin comprises at least one member selected from polyacetals, polyacetates, cellulosics, nylons, polyamides, polyimines, polyesters, polyethers, polysulfones, and copolymers thereof.

Preferably, the microwave absorbing material comprises polyester and the polyester preferably comprises a member selected from polyalkyl esters, polyaryl esters, and copolymers thereof.

Suitable polyester comprise compounds having repeating units having the following formula (or which are derived from compounds having such a formula)

wherein $R^1$ and $R^2$, which may be the same or different, are as defined in further detail below.

Preferred polyesters comprise a member selected from polyalkylene terephthalate, polybutylene terephthalate, polycyclohexamethylene terephthalate, PETG, PCTG, PCTA, and copolymers thereof. Of these, PCTG and PETG are especially preferred, with PCTG being especially preferred.

In some embodiments, microwaveable heat retentive containers of the invention include those wherein the container comprises
(a) an inner shell forming a shape adapted to receive a food or beverage product, and
(b) an outer shell associated with the inner shell and forming a cavity therebetween; and
wherein a pouch containing a microwaveable material as defined above is disposed in the cavity.

Preferably, the cavity further comprises an insulating element, preferably foam, such as polyurethane or polystyrene to reduce outward radiant heat loss. In some such embodiments, the material susceptible to heating by microwave radiation, said material having a time/temperature profile such that, when from approximately 20–150 grams of said material, preferably from about 25 to about 100 grams, and more preferably about 30 to about 80 grams, most preferably about 60 grams, is subjected to microwave radiation having a frequency of from approximately 2,300–2,600 MHZ, more preferably 2,400–2,500 MHZ, more preferably about 2,450 MHZ, at a power of from approximately 600–1,000 W, more preferably about 750–1000 W, for a period of approximately 1¼–2½ minutes, more preferably approximately 1½–2¼ said material is heated to a temperature in a range of approximately 175°–320° F.

In some embodiments, the inner wall of (b) defines a receiving portion having a volume for receiving a material, and wherein the ratio of the mass, in grams, of said material susceptible to microwave radiation, to the volume of the receiving portion, in milliliters, is from about 1:5 to about 1:12, preferably about 1:5 to about 1:10 and most preferably about 1:6 to about 1:8.

The invention also provides a method of providing a heated product to a consumer or user, comprising
(a) placing a microwaveable container in a microwave oven, the container comprising a material susceptible to heating by microwave radiation, and having a time/temperature profile as defined above;
(b) adding heated product to said container, either prior or subsequent to (a); and
(c) providing said container with heated product to a consumer or user.

The microwave absorbing materials, container materials and pouch in such methods are all preferably as defined above.

BRIEF DESCRIPTION OF THE DRAWINGS

The foregoing and other objects, features, and advantages of the invention will be apparent from the following more particular description of the preferred embodiments, as illustrated in the accompanying drawings, in which reference characters refer to the same, or like, parts throughout the various views, and wherein:

FIG. 2A is a graph of the thermal efficiency of a 0.5 liter heat retentive food jar using a microwave energy absorbing pouch according to the present invention, compared a 0.5 liter food jar insulated by a metallized glass vacuum according to the prior art.

DETAILED DESCRIPTION OF PREFERRED EMBODIMENTS OF THE INVENTION

The microwave absorbing materials of the invention can be employed in any type of article, e.g., receptacle or container. The microwave absorbing materials are preferably, although not necessarily, disposed in a pouch. The pouch can then be employed in conjunction with articles, including receptacles or containers to provide various other embodiments of the invention, specific examples of which are discussed below.

Figure 1:
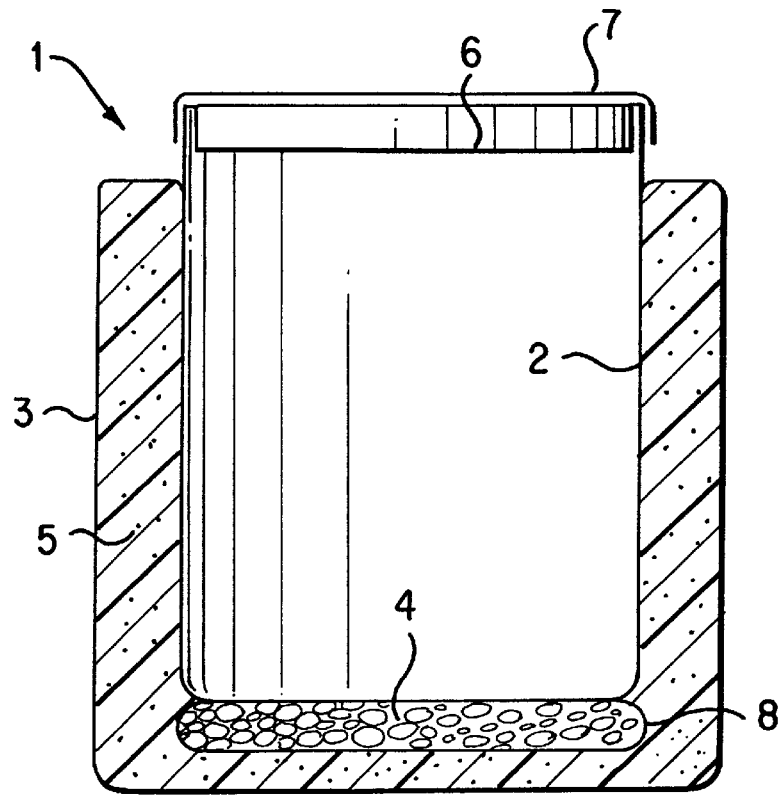
FIG. 1 is a schematic cross-sectional view of a heat retentive food jar assembled according to the invention.

FIG. 1 discloses a microwaveable heat retentive container according to this invention, designated generally as 1. The container preferably has an inner shell, or liner 2, and an outer shell 3. The inner shell or liner 2 and the outer shell 3 may be formed of any suitable material well known to those of ordinary skill in the art such as polyethylene, polypropylene, polycarbonate, and acrylonitrile butadiene styrene copolymer. Polyolefins formed from monomers having from 2 carbons to 4 carbons are preferred. Polypropylene is most preferred. As used herein, the terms inner shell and liner can be used interchangeably to refer to the innermost wall of the container, i.e., the wall which actually contacts the contained food. In some embodiments, it is preferable that the inner shell be thermally conductive. In addition, it is preferable that the inner shell consist of materials which are substantially microwave transparent. Thus, the inner shell may be composed of a material which can withstand heating up to approximately 150° C. without structural damage. Suitable materials include plastics, such as polymers. Preferably the inner shell is composed of a polypropylene. Preferably the inner shell is composed of a nucleated polypropylene homopolymer. As used herein, the term nucleated polypropylene homopolymer refers to a polypropylene polymer in which agents are added to increase the rate of crystallization of the polymer. A suitable nucleated polypropylene homopolymer is ACCPRO, available from Amoco Plastics.

The container of FIG. 1 preferably comprises an outer shell, or jacket 3. As used herein, the terms outer shell and jacket are meant to describe the same structural feature in a particular embodiment discussed. In addition, it is preferable that the outer shell consist of materials which are microwave transparent. It is preferable that the outer shell be composed of a material which will withstand heating up to approximately 300° F. without structural damage. The outer shell is preferably formed of a plastic material, more preferably the outer shell is composed of polypropylene. Most preferably the outer shell is composed of a polypropylene homopolymer.

The inner and outer shell can be affixed or connected to each other by any means well known to those of ordinary skill in the art, such as by a snap fit construction, or by welding, including solvent welding, spin welding, sonic welding, etc., and U.S. Pat. No. 5,515,995, to ALLEN et al., U.S. Pat. No. 3,684,123, to BRIDGES, U.S. Pat. No. 4,184,601, to STEWART et al. (each incorporated by reference above) disclose suitable fabrication techniques. The container of FIG. 1 further comprises a pouch 8 containing a microwave absorbing material 4. The pouch is preferably composed of materials which are microwave transparent, such as a polyolefin. The pouch in which the microwave absorbing material is placed is preferably formed of polyethylene, e.g., linear low density polyethylene, polypropylene, nylon, polyester, and most preferably polypropylene. In preferred embodiments, the microwave absorbing material substantially fills the pouch.

Figure 13:
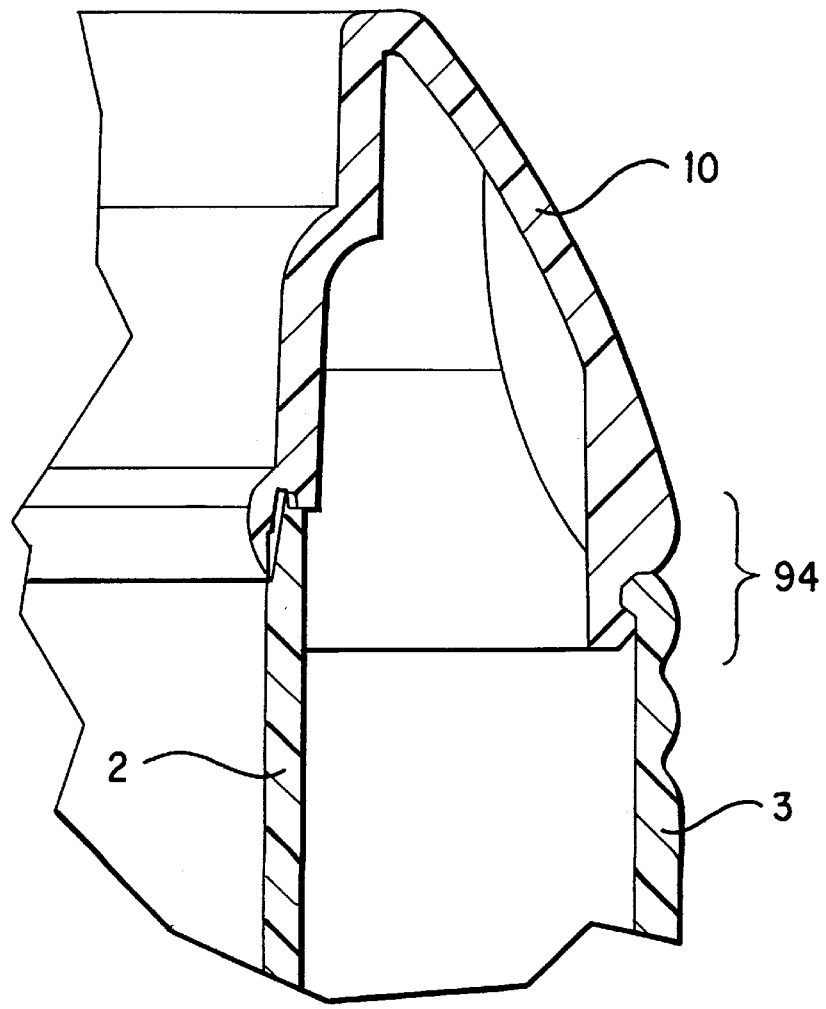
FIG. 13 shows an enlarged cross-sectional representation of one way in which the inner liner 2 may be attached to the outer shell 3.

A suitable means by which inner liner 2 may be affixed to outer shell 3 by means of a snap fit construction is shown in FIG. 13. The snap fit portion of the construction is designated generally as 94. As shown, the outer shell 3 is attached to inner liner 2 by means of an intermediate upper collar 10. The inner liner 2 may be attached to intermediate collar 10 by any means known to one of ordinary skill in the art and preferably by spin welding.

Figure 12:
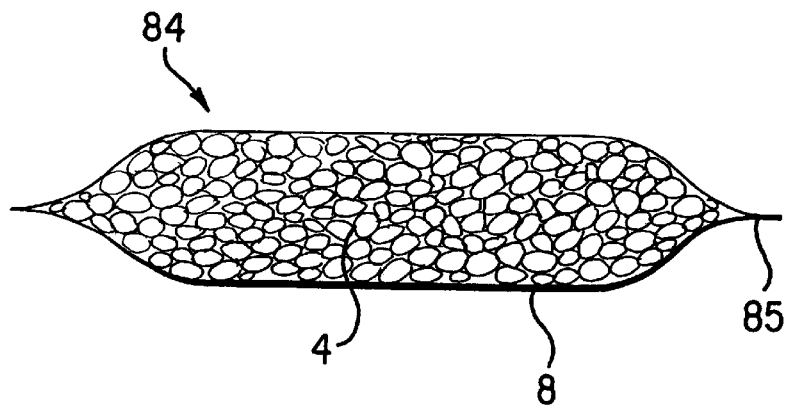
FIG. 12 is a schematic, cross-sectional representation of a microwave energy absorbing pouch according to the invention.

The pouch 8 may be fabricated by any means suitable to those of ordinary skill in the art, such as by heat sealing. As shown in FIG. 12, the pouch 8 comprises marginal portions, which are preferably heat sealed by sealing the marginal portions or edges 85 with heat and pressure by means well known to those of ordinary skill in the art. U.S. Reissue Pat. No. RE 34,929, to Tilia, Inc., relates to such systems and is hereby incorporated by reference as though set forth in full herein.

The microwave absorbing composition can be selected based on its time/temperature profile. Preferred microwave absorbing materials do not depend on a liquid to solid phase change to maintain thermal efficiency. It is preferable to select a microwave absorbing compound which exhibits a high heat capacity, and is capable of absorbing microwave energy. In this regard, it is a feature of the invention that the microwave absorbing material may be employed in accordance with the invention without the need to employ adjuvants or additives to alter the response of the microwave absorbing material to microwave energy.

Preferably, the microwave absorbing material contains microwave excitable atoms. While not wishing to be bound by theory, it is believed that these groups are involved in the absorption of microwave energy due their polarity or the net dipole moment of a molecule containing such an atom. Excitable atoms include, but are not limed to, sulfur, nitrogen, oxygen. In preferred embodiments, the microwave absorbing composition contains 1 or more, more preferably 2 or more, even more preferably 3 or more, and most preferably from 2–4 excitable atoms per repeat unit in a microwave absorbable polymer. Materials with 4 or more excitable atoms per repeat unit may also be employed. As used herein, the term repeat unit refers to a single monomeric substituent of a polymer. As used herein , the term "microwave absorbable" or "microwave absorbing" or "microwave susceptible" means capable of absorbing microwave energy, the practical result of which is an increase in temperature.

The microwave absorbing material preferably comprises a polymer resin. Polymer resins include, but are not limited to, polymers comprising polyacetals, polyacetates, cellulosics, nylons, polyamides, polyimines, polyimides, polyesters, polyethers, polysulfones, and copolymers thereof. Preferably, the microwave absorbing material comprises polyester, which preferably comprises polyalkyl ester, polyaryl ester, or copolymers thereof. Preferable polyesters include, but are not limited to polyesters comprising polymers comprising repeating units derived from polyethylene terephthalate and related compounds. Thus preferred polyesters comprise polybutylene terephthalate, polycyclohexamethylene terephthalate, PETG (PET modified with ethylene glycol), PCTG (PET modified with polycyclohexamethylene glycol), PCTA (acid modified PET) and copolymers and mixtures comprising these materials.

Preferred microwave susceptible materials comprising polyester materials include those comprising and/or derived from repeating units having a structure in accordance with the following general formula (Formula I):

(I)

wherein $R^1$ and $R^2$, which may be the same or different, is each independently selected from a single bond; $C_6$–$C_{12}$ cycloalkyl; $C_2$–$C_{20}$ alkyl; $C_2$–$C_{20}$ alkyl containing 1–5, preferably 1–3 and more preferably 1–2 nitrogen, oxygen or sulfur substituent(s); $C_2$–$C_{20}$ alkenyl with from 1–5 double bonds (conjugated or unconjugated) and preferably from 1–2 double bonds (conjugated or unconjugated); or —$R^3R^4R^5$—, wherein $R^4$ is $C_6$–$C_{12}$ cycloalkyl and $R^3$ and $R^5$ are each independently selected from a single bond, $C_1$–$C_{20}$ alkyl or $C_2$–$C_{20}$ alkenyl. When $R^1$ and $R^2$ are alkyl containing a nitrogen, oxygen or sulfur substituent as defined above, the substituent may be in the carbon chain (for example as a substitute for a C atom, as in —C—O—C—) or as a member of a side chain, or functional group as, for example, in —COOH (carboxylic acid), or —CO— (ketone), for example.

Preferably, $R^1$ is a single bond and $R^2$ is preferably selected from $C_2$–$C_4$ alkyl, and —$R^3$—$R^4$—$R^5$— wherein $R^4$ is cyclohexyl and $R^3$ and $R^5$ are each —$CH_2$—. Most preferably $R^1$ is a single bond, and $R^2$ is selected from —$CH_2$—, —$CH_4$— and or —$R^3R^4R^5$—, wherein $R^4$ is $C_6$–$C_{12}$ cycloalkyl and $R^3$ and $R^5$ is each —$CH_2$—. Mixtures and/or blends of each of the foregoing can also be employed, and copolymers and multimers derived from mixtures of the foregoing may also be employed. Highly preferred microwave absorbing materials can be structurally represented by the following formulas and/or are derived from materials having the following structural formulas:

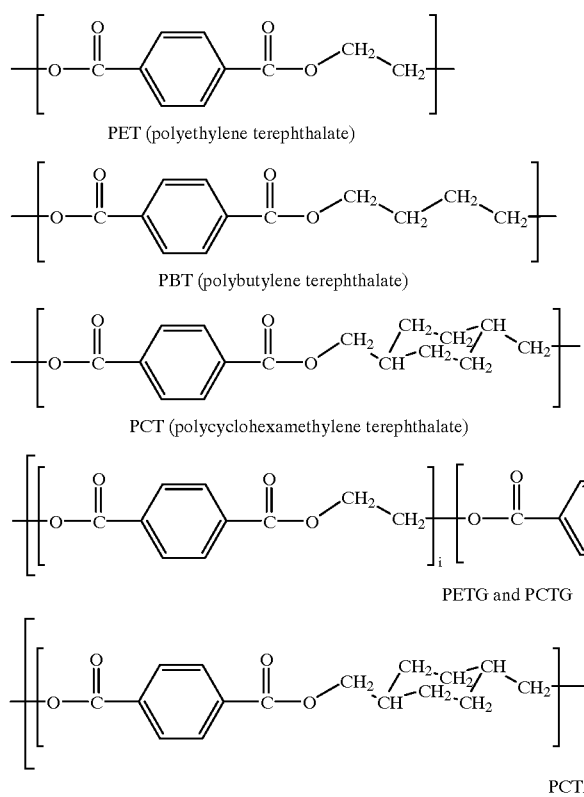

PET (polyethylene terephthalate)

PBT (polybutylene terephthalate)

PCT (polycyclohexamethylene terephthalate)

PETG and PCTG

PCTA

In the formulas immediately above a suitable number of repeating units can be readily determined by those of ordinary skill in the art. Particularly preferred microwave heatable materials are available from Eastman Performance Plastics, P.O. Box 1969, Kingsport, Tenn. 37662, and are sold under the following trade names: EXTAR FB AG330 (trade name for PCTA); EKTAR COPOLYESTER PETG (trade name for PETG); EXTAR FB CG011 (trade name for PCT); EKTAR FB DG003 (trade name for PCTG).

In preferred embodiments, the mass of the microwave absorbing material is that which, when exposed to microwave radiation in the range of approximately 2,300 to 2,600 MHZ, at a power of approximately 600 to 1,000 W, for a period of approximately 1¼ to 2¼ minutes, heats to a temperature of approximately 175° F. to approximately 320° F. More preferably, the microwave radiation is in the range of approximately 2,400 to 2,500 MHZ, and in the most preferred embodiment, the microwave energy is at approximately 2,450 MHZ. The microwave power more preferably falls within the range of approximately 750 to 1,000 W. The time of heating at these settings is more preferably approximately 1¼ to 2½ minutes, and is most preferably approximately 1½ to 2¼ minutes. Of course, when the microwave absorbing material is exposed to microwave energy at a higher power, the time of heating will likely be less. Conversely, at a lower power, the heating of the microwave absorbing material could take longer.

Microwave absorbing materials of the present invention preferably comprise polymeric resin having a melting point of greater than about 350° F., more preferably greater than about 400° F., and most preferably greater than 450° F.

The mass of the microwave absorbing material is preferably chosen based on the volume of the container with which it is associated. Preferably, the ratio of the mass of microwave absorbing material, in grams, to the volume of the container, in milliliters, is from about 1:5 to about 1:12. More preferably, the ratio is from about 1:5 to about 1:10. In the most preferred embodiment, the ratio is from about 1:6 to about 1:8. For example, for a 500 milliliter container, the mass of the microwave absorbing material is preferably greater than approximately 40 grams, but less than approximately 90 grams. More preferably, the mass of the microwave absorbing material is greater than about 50 grams, and even more preferably, greater than about 60 grams. The mass of the microwave absorbing material is preferably less than about 100 grams, and even more preferably less than about 80 grams. Most preferably, the mass of the microwave absorbing material is about 60 grams. Of course, the higher the mass of the microwave absorbing material, the longer the time necessary to heat to the desired temperature. However, increasing the mass of the microwave absorbing material above approximately 100 grams does not significantly enhance the heat retentive properties of the container. Therefore, the most preferred embodiment, 60 grams, is selected by balancing heating time with the performance of the microwave absorbing material in the finished container.

Preferably, microwaveable heat retentive containers of the invention can, upon preheating the container and placing food or beverage at a temperature of at least approximately 185° F. into the container, maintain the heat of the contents to at least approximately 130° F., after about six hours in the container, whether the container is heated empty, i.e., without contents therein, or full, i.e., with the contents therein.

The container of FIG. 1 further comprises insulation 5, preferably foam insulation. In preferred embodiments, the foam insulation is a polyurethane foam. The container of FIG. 1 further comprises a two-piece closure assembly, comprising an inner stopper 6, and an outer lid 7. In preferred embodiments, the closure assembly is formed of plastic materials. More preferably the closure assembly is composed of polypropylene. Preferably the closure assembly is composed of a polypropylene homopolymer.

Figure 3:
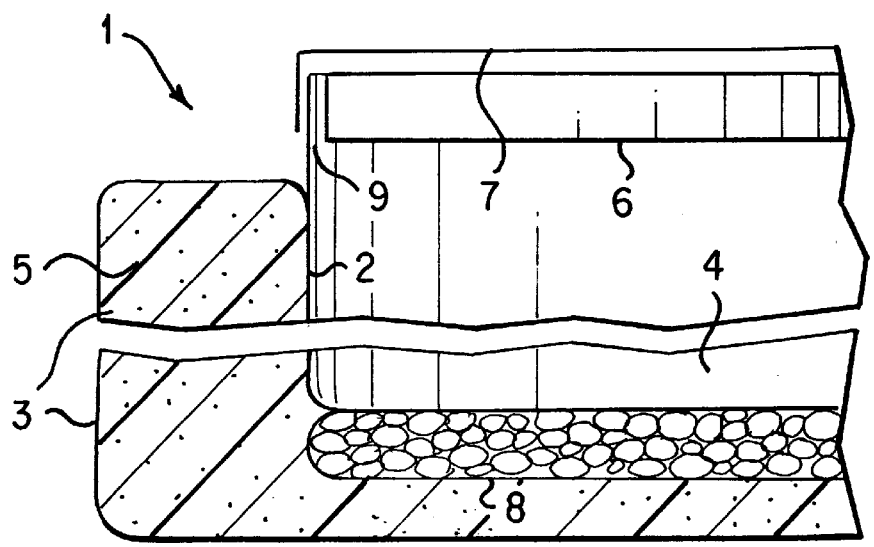
FIG. 3 is an enlarged cross-sectional view of the food jar shown in FIG. 1, with a portion broken away.

Portions of the container shown in FIG. 1 are shown in greater detail in the cross-sectional view of FIG. 3. FIG. 3 shows the relationship between the pouch 8 containing the microwave absorbing material 4 and the inner shell 2, the foam insulation 5, and the outer shell 3. FIG. 3 also shows schematically the relationship between the stopper 6, the inner shell 2, the outer shell 3, and the lid 7. Stoppers 6 may be employed to seal the container by any means known to those of ordinary skill in the art, such as threading 9 or friction fit, in conjunction with standard seals, gaskets, and the like.

Figure 4:
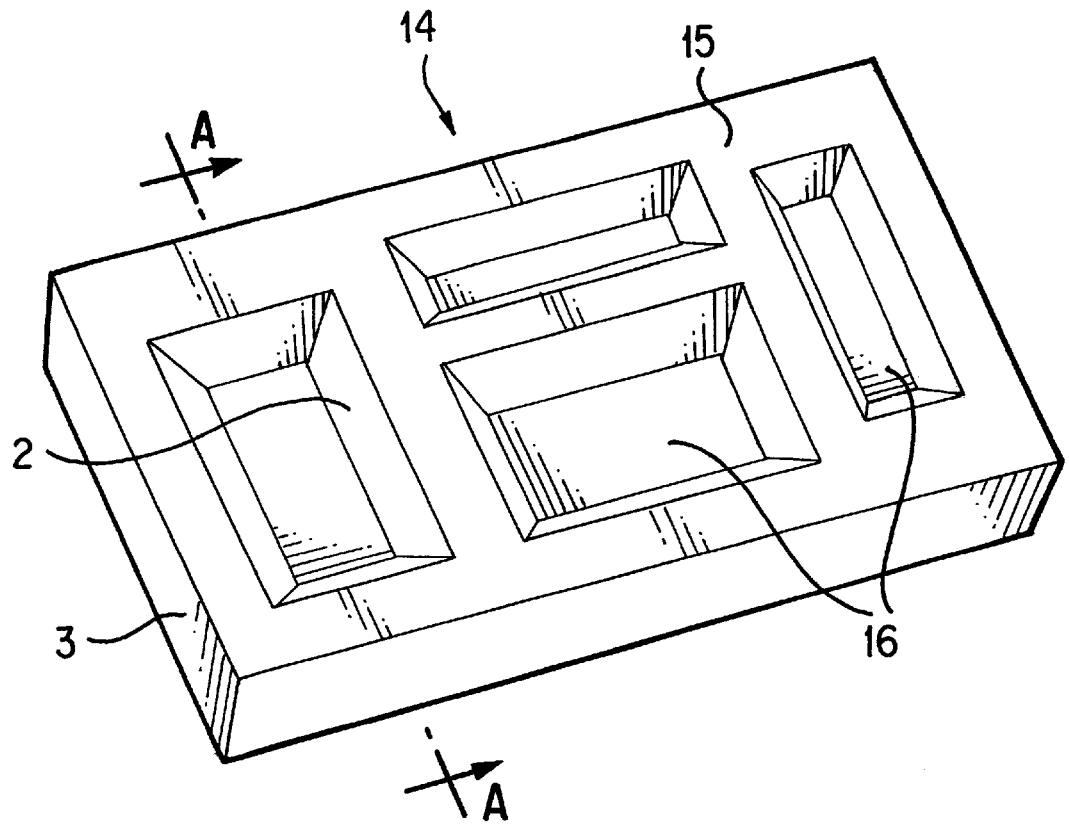
FIG. 4 is a perspective view of a food service tray according to the present invention.
Figure 5:
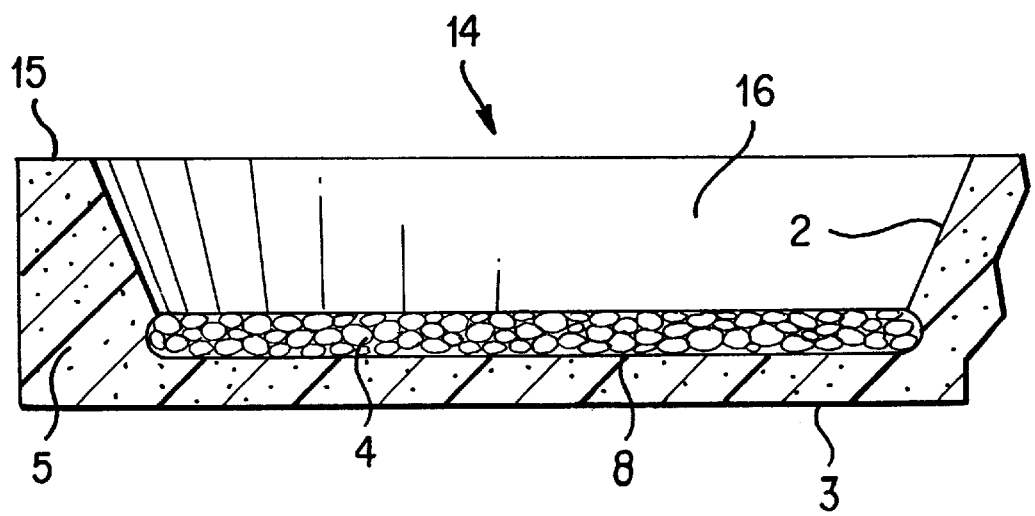
FIG. 5 is a cross-sectional view of the food service tray of FIG. 4, taken along the line A—A.

FIGS. 4 and 5, respectively, show perspective and cross-sectional views of a microwaveable heat retentive food service tray assembled according to the invention, generally designated 14. The food service tray 14 comprises a tray top 15. The food service tray 14 further comprises an outer shell 3 and an inner shell 2. The outer shell 3 and inner shell 2 can be assembled by any system known to those of ordinary skill in the art such as by way of a snap fit construction and the interior can be filled with foam 5, all of the foregoing being performed as taught in U.S. Pat. No. 5,145,090 to Wyatt, which patent is hereby incorporated by reference as though set forth in full herein. The tray top 15 and the inner shell 2 of the food service tray are formed in a manner to define separate food compartments 16. In a preferred embodiment, those compartments which are intended to contain hot foods, are placed adjacent a pouch containing the microwave absorbing material 4. In a preferred embodiment, approximately 40 grams of the material is used, the amount selected based on the volume of the compartment. The tray top 15 and the inner shell 2 can be formed continuously of the same piece of plastic material. In a preferred embodiment, the food service tray 14 further comprises foam insulation 5 which fills the remaining space of the cavity formed by the inner shell 2, tray top 15, and outer shell 3. In a preferred embodiment of the invention, those compartments which are intended to hold hot foods are filled with those foods, and the tray 14 is then microwaved for approximately 1½ minutes at approximately 600 to 1,000 watts. After heating in the microwave oven, the tray is removed, and those compartments intended for cold foods are filled. In such an embodiment, the tray keeps the hot foods hot and the cold foods cold.

Figure 6:
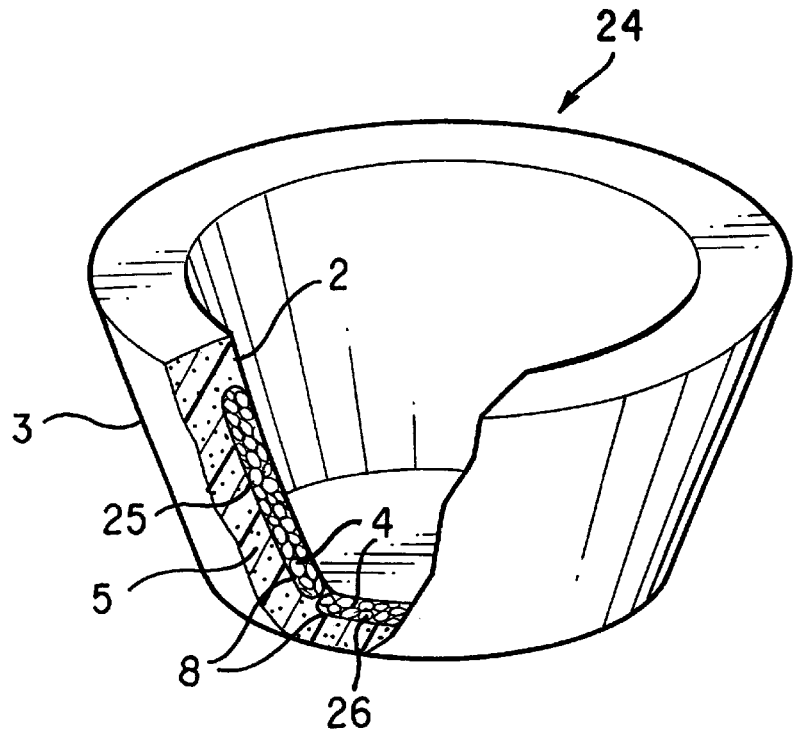
FIG. 6 is a perspective view of a serving container with a portion cut away to show an assembly according to the invention.

FIG. 6 shows another embodiment of the invention, a microwaveable heat retentive serving container, generally designated 24. The serving container 24 comprises an inner shell 2 which is bowl-shaped. The serving container 24 further comprises an outer shell 3 which is substantially bowl-shaped as well. Because of the size and shape of the serving container, it is preferred to place pouches 8 containing the microwave absorbing material 4 both in the sides 25 of the serving container and in the bottom 26 of the serving container. In addition, the serving container 24 further comprises a foam insulating material 5. In a preferred embodiment, the mass of the microwave absorbing material 4 in the bottom 26 is preferably 100 grams, and four pouches, each containing 25 grams, are distributed around the sides 25 of the serving container 24. In a preferred embodiment, the serving container 24 is placed in a microwave oven prior to being filled with food. The serving container 24 is heated for approximately 2 minutes at approximately 600 to 1,000 watts. Upon removal from the microwave oven, the container 24 is filled with food to be served. In another preferred embodiment, the empty serving container 24 is filled with the food to be served prior to placement in the microwave. In this embodiment, neither the serving container 24 nor the food is heated prior to placement in the microwave oven. In this embodiment, both the food and serving container 24 are heated simultaneously in the microwave for approximately 4 minutes at approximately 600 to 1,000 watts. The serving container 24 containing the hot food is then removed from the microwave oven for serving.

Figure 7:
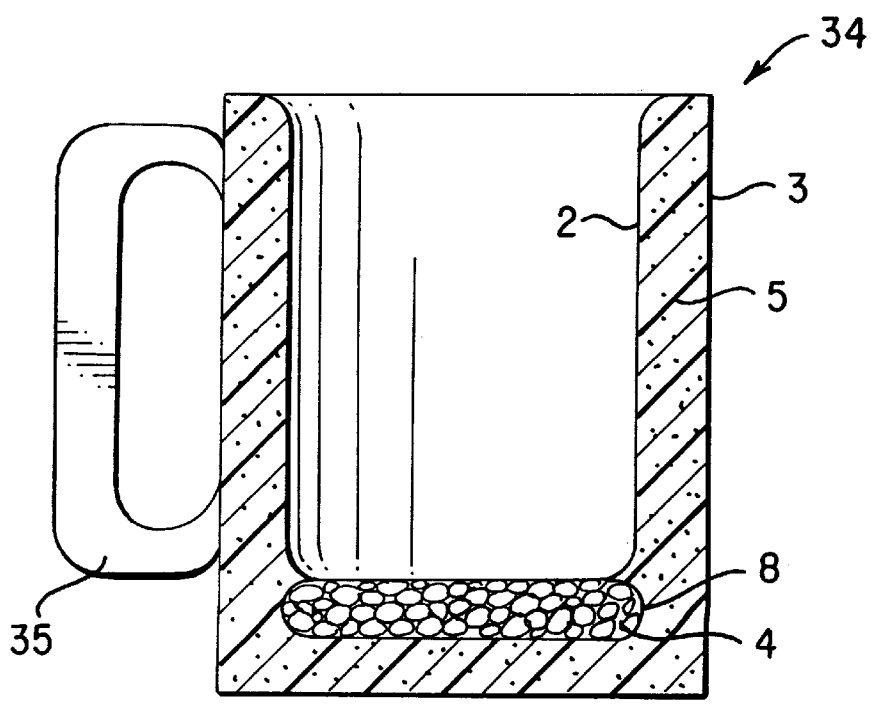
FIG. 7 is a cross-sectional view of a beverage mug according to the invention.

FIG. 7 shows another embodiment of the invention, a microwaveable heat retentive beverage mug, generally designated 34. The mug 34 comprises an inner shell 2, an outer shell 3, a pouch 8 containing a microwave absorbing material 4, and an insulating material 5. The mug 34 also has a handle 35 for ease of use. In a preferred embodiment, the mug 34 has a capacity of 12 to 20 fluid ounces and has a single 50-gram pouch 8 of microwave absorbing material in the base. The mug may be preheated in a microwave oven prior to receiving its contents. Alternatively, the mug may be filled and then heated together with its contents in a microwave oven.

Figure 8:
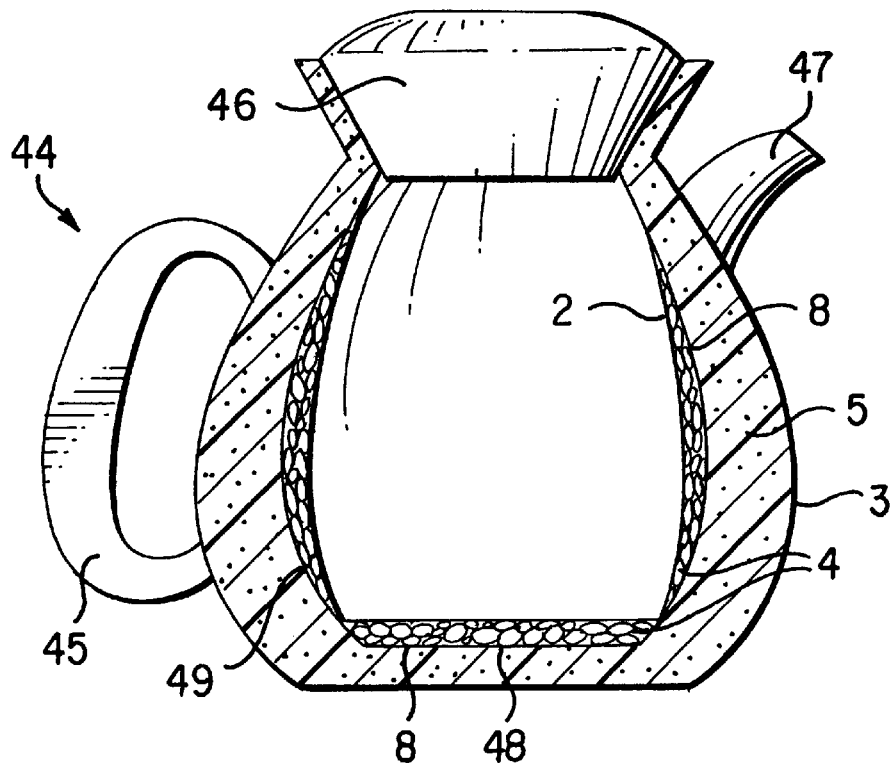
FIG. 8 is a cross-sectional view of a carafe according to the invention.

FIG. 8 shows a microwaveable heat retentive carafe in accordance with the invention, generally designated 44. Preferably, the carafe 44 comprises an inner shell 2, an outer shell 3, a microwave absorbing material 4, and an insulating material 5. The carafe also comprises a handle 45 for ease of use, a stopper 46, and a spout 47 to aid in pouring. In preferred embodiments, the 1.0 liter carafe has a 100-gram pouch 8 of microwaveable material in the base 48. Carafes with greater volumes, such as 48 and 64 fluid ounces are also contemplated. For the larger carafes, it would be preferable to use larger masses of microwaveable materials (such as 1 pouch having 120 grams of microwaveable material), and one of ordinary skill in the art would readily recognize how to do so based on the disclosure herein. The carafe may be preheated in a microwave oven prior to receiving its contents. Alternatively, the carafe may be filled and then heated together with its contents in a microwave oven.

Figure 9:
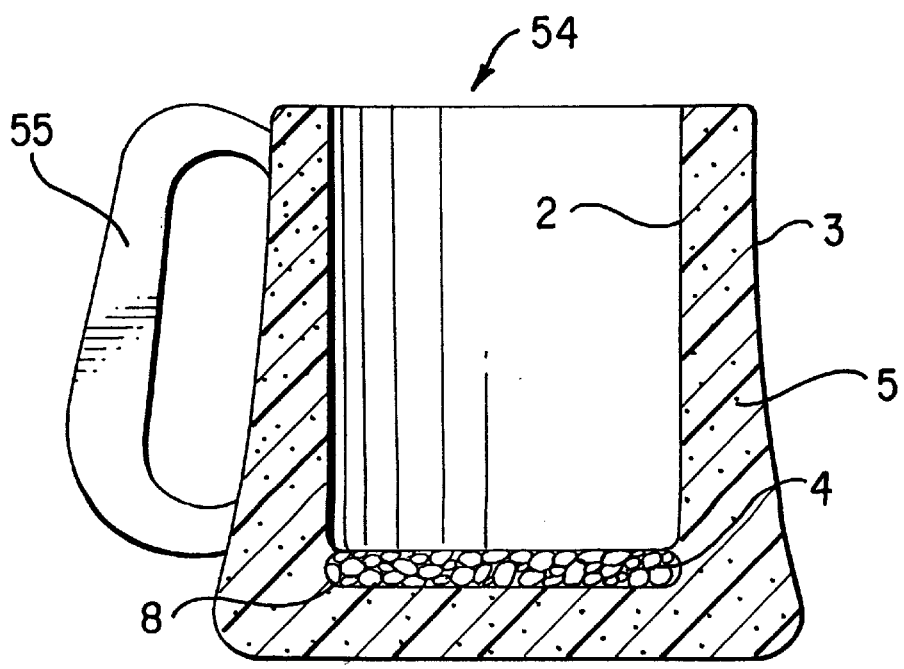
FIG. 9 is a cross-sectional view of a wide-bottom mug according to the invention.

FIG. 9 shows a microwaveable heat retentive wide-bottom mug in accordance with the present invention, generally designated 54. The wide-bottom mug 54 comprises an inner shell 2, an outer shell 3, a pouch 8 containing a microwave absorbing material 4, and an insulating material 5. In addition, the wide-bottom mug comprises a handle 55 for ease of use. In a preferred embodiment, the 12 to 16 fluid ounce capacity wide-bottom mug 54 has a single 50-gram pouch of microwave absorbing material in its base. In one embodiment, the wide-bottom mug may be preheated in a microwave oven prior to receiving its contents. In another embodiment, the wide-bottom mug may be filled and then heated together with its contents in a microwave oven.

Figure 10:
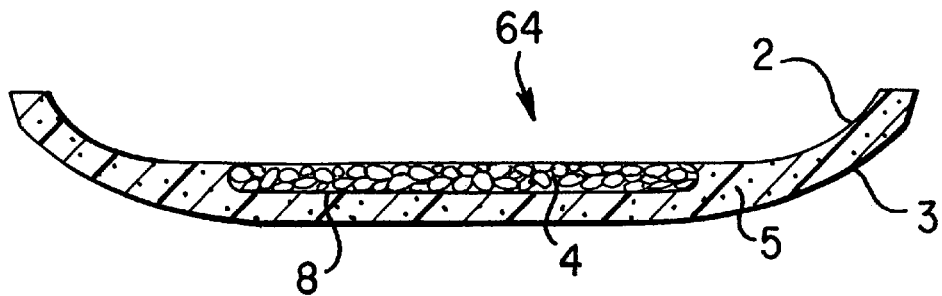
FIG. 10 is a cross-sectional view of a baby food serving dish according to the invention.

FIG. 10 shows another preferred embodiment, the microwaveable heat retentive baby food dish in accordance with the present invention, generally designated 64. The baby food dish 64 comprises an inner shell 2, an outer shell 3, a pouch 8 containing a microwave absorbing material 4, and an insulating material 5. In preferred embodiments, the baby food dish contains a 80-gram pouch in the base of the dish. Upon heating in a 750 watt microwave for approximately 2 minutes, the microwave absorbing material in the baby food dish heats up to approximately 230° F. In preferred embodiments, the baby food dish is preheated in a microwave oven, and then filled with baby food at ambient temperature. In this embodiment, the baby food dish warms the baby food to a temperature that this desirable, and maintains that temperature for a desirable period of time.

Figure 11:
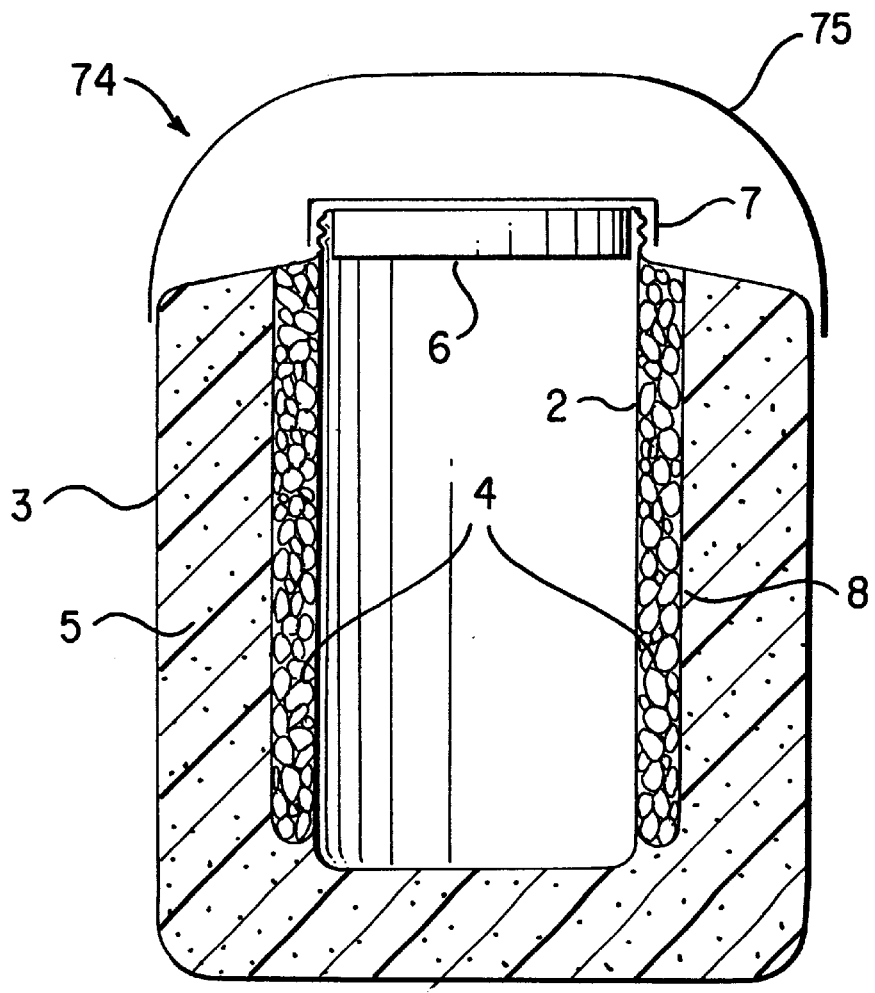
FIG. 11 is a cross-sectional view of a microwave heat retentive thermal bottle according to the invention.

FIG. 11 discloses an alternative embodiment of a microwaveable heat retentive thermal bottle in accordance with the present invention, generally designated 74. The thermal bottle preferably comprises an inner shell 2, an outer shell 3, a pouch 8 containing a microwaveable material 4, a foam insulating material 5, a stopper 6, and a lid 7. Additionally, the thermal bottle comprises a bowl-shaped lid 75, which can be taken off and used as a bowl for use in eating or drinking.

FIG. 12 discloses a pouch or envelope 8 containing a microwave absorbing material 4, the whole assembly generally designated 84. The edges 85 can be sealed with heat and pressure, or by any other means known in the art.

Figure 14A:
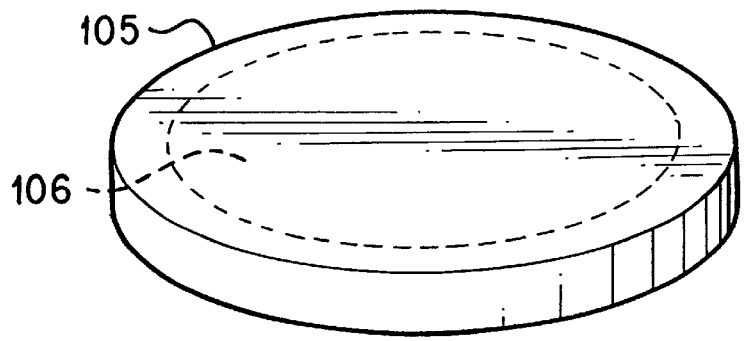
FIG. 14A is a perspective view of a heat-storing puck according to the present invention.
Figure 14B:
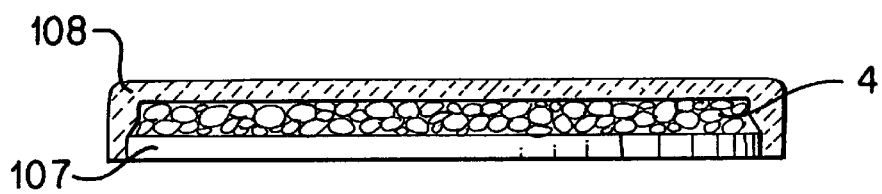
FIG. 14B is a cross-sectional representation of the heat-storing puck of FIG. 14A.

A heat-storing puck, generally designated 105, shown in FIG. 14A has a center portion which contains a microwave absorbing material in accordance with the present invention. The dotted line in FIG. 14A roughly indicates the area under which the microwave absorbing material is present. FIG. 14B shows a cross-sectional view of the heat-storing puck of FIG. 14A. The microwave absorbing material 4 may be held in the center portion of the heat-storing puck by a stopper piece 107. The puck body 108 may be formed of any material which is suitable for use as a puck and which will withstand microwave heating, and ceramics are especially preferred. The stopper piece 107 may be made of ceramic as well, or may be constructed of a different material. A heat-storing puck in accordance with the present invention may be microwaved prior to supporting a heated dish or food container, or prior to being placed in a food container, such as a food carrying container including insulated plastic food carrying containers, or food carrying containers of other types, such as a pizza delivery box or the like, thereby keeping the temperature of the food in the dish or food container elevated for an extended period of time.

Figure 15:
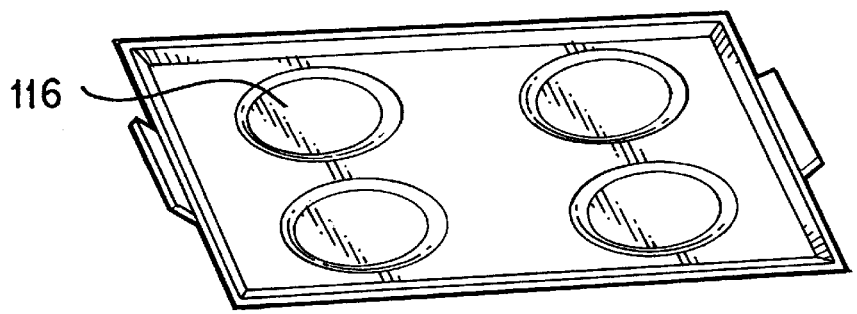
FIG. 15 is a perspective view of a heat-storing service tray according to the present invention.

A service tray in accordance with the present invention is shown in FIG. 15. The embodiment of FIG. 15 includes four separate portions which would contain a heatable member in accordance with the present invention. For example, in one embodiment, the tray may have indentations 116 at the four portions. Into these portions may be inserted the heat-storing pucks of FIGS. 14A and 14B. For those foods which are to be served hot, the pucks are heated in a microwave prior to placing in the service tray. Alternatively, some of the pucks may be cooled prior to placing in the service tray, thereby enhancing the service of either hot or cold foods. Of course, the tray may be manufactured with the microwave absorbing material sealed into the tray material, rather than in modular form as described above.

Figure 16:
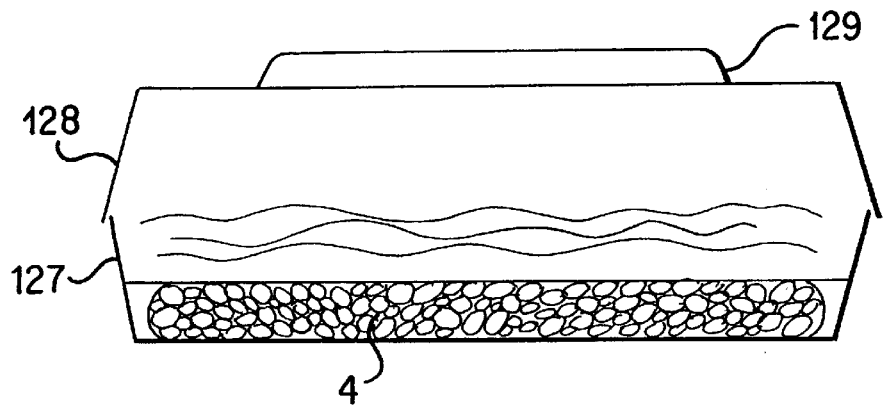
FIG. 16 is a cross-sectional view of a tortilla warmer according to the present invention.

The heat-storing puck of FIG. 14A and 14B may also be used in a tortilla warmer such as that disclosed in FIG. 16. Like in the tray described above, the puck may be heated prior to being placed in the base 127 of the tortilla warmer. Hot tortillas (or rolls, buns, or any other bread or food desired to be maintained warm, such as pizza, pasta, etc.) is then placed on top of the puck, thereby maintaining the heat of the food for an extended period of time. Heat is contained by the use of a lid 128, which has a handle 129.

The foregoing specific embodiments are illustrative of applications in which the microwave absorbing compositions of the invention can be employed. Those of ordinary skill in the art will readily understand that other applications are suitable for the microwave absorbing material of the invention as well. Thus, the invention can be employed to keep the contents of the otherwise conventional coolers, such as picnic coolers, and ice chests, warm, or at elevated temperatures for extended time periods.

Additionally, the invention can also be employed to warm mittens or gloves, boots, scarves, etc. In certain applications, the pouch of the present invention can be employed as an insert for clothing, e.g., scarves, jackets, etc.

Without further elaboration, it is believed that one skilled in the art can, using the preceding description, utilize the present invention to its fullest extent.

The following preferred specific embodiments are, therefore, to be construed as merely illustrative, and not limitative of the remainder of the disclosure in any way whatsoever.

EXAMPLES

Example 1

A number of different compounds were tested for their ability to perform as microwave absorbing heat storage materials within the context of the present invention. Table 1 lists those materials which were tested, whether or not they performed adequately (+ for adequately, – for inadequately), as well as comments on their performance (where appropriate).

TABLE 1

Materials Tested

| Material | Performance | Comments |
|---|---|---|
| Polyesters | | |
| PBT | +/– | very uneven heating - low temperature |
| PET | – | |
| PETG | + | |
| PCT | – | |
| PCTG | + | |
| PCTA | + | |
| PC | – | |
| Crystalline Resins | | |
| PE with receptors | + | very uneven heating |
| PP/CaCO$_3$ filled | – | |
| PMP (TPX) | – | |
| Acetal | + | degrades and outgases |
| Nylon 66 | + | very uneven heating |
| Nylon 6 | + | melted in spot concentration |
| Nylon 612 | + | strong odor - spotty melting |
| Styrenics | | |
| HIPS | – | |
| SAN | – | |
| ABS | – | |
| ASA | – | |
| Rubbers | | |
| Styrene butadiene | – | |
| TPV | – | |
| Other Resins | | |
| PVC | – | |
| PU | + | burns easily |
| PMMA | – | |
| Refractory Materials | | |
| Ceramic Fiber | + | generates steam |
| Millboard Discs | + | generates steam |
| Calcium Silicate Board | + | generates steam |
| Silica-Alumina Board | – | |
| Vermiculite Board | + | burns |
| Organics | | |
| Olefin Waxes with receptors | + | uneven heating - separation of added receptors |
| Glycerine | + | high temperature, odor, vapors |
| Monoglycerides | + | |

TABLE 1-continued

Materials Tested

| Material | Performance | Comments |
|---|---|---|
| Erucaminde (amide slip agents) | – | |
| Octadecanoic Acid Amine | – | |
| Powders/Pellets | | |
| Melamine | + | strong odor, burns |
| SiO$_2$ | | |
| CaSiO$_2$ | +/– | marginal temperature rise - steam generated |
| CaSO$_4$ | – | |
| NaOH | + | ignited, burns |
| Molecular Sieve (NaAlO$_2$SiO$_2$-H$_2$O) | + | steam generation |
| Recyclospheres (coal combustion by-product) | – | |

Example 3

Materials were tested for their performance with regard to melting point, molecular weight of the individual repeating units in the chain, and number of excitable groups in the individual repeating units. 100 Grams of each material was subjected to microwave radiation having a frequency of 2450 MHZ and a power of 750 watts, with results reported in Table 2, below:

TABLE 2

| POLYMER | MELTING POINT | REPEATING CHAIN MOLECULAR WT. | NO. OF EXCITABLE GROUPS IN REPEAT CHAIN | 3 Min. Micw. 100 G. Wt |
|---|---|---|---|---|
| PET | 485° F. | 194 | 2 | 122° F. |
| PBT | 482° F. | 222 | 2 | 115° F. |
| PCT | 559° F. | 276 | 2 | |
| PETG | 500° F. | 470 | 4 | 180° F. |
| PCTG | 545° F. | 470 | 4 | 160° F. |
| PCTA | 560° F. | 552 | 4 | 160° F. |
| Glass Filled PCTG | 575° F. | 470 | 4 | 175° F. |

These data demonstrate that, in general, as the number of excitable groups in the repeat chain increases, the material in question translates more microwave energy into heat energy under the same conditions (time/power/mass of material, etc.).

Example 4

Figure 2B:
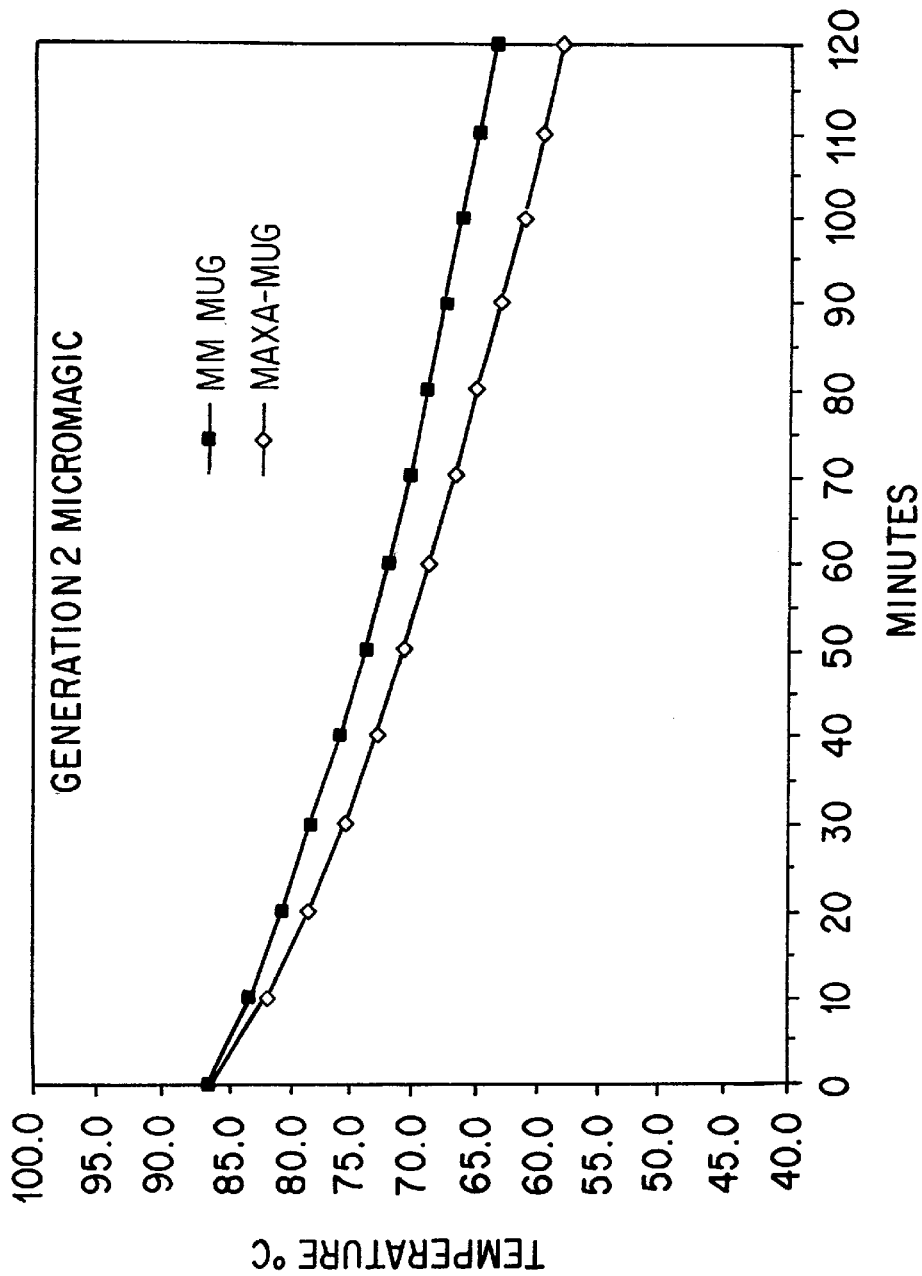
FIG. 2B is a graph of the thermal efficiency of a 0.5 liter heat retentive food jar using a microwave energy absorbing pouch according to the present invention, compared a 0.5 liter food jar utilizing glyceryl monostearate.

The materials of the present invention were evaluated by following the procedures set forth in commonly assigned co-pending application Ser. No. 08/781,630, filed Jan. 10, 1997, incorporated by reference above using PCTG and a glass vacuum liner. The thermal efficiency of each of the containers was measured according to the following procedure: 3 to 4 ounces of water was placed into the microwave container. The container was heated in a 750 watt microwave oven at full power for approximately 4 minutes. The container was removed from the oven and the emptied. The container was then filled to capacity with hot water at 85° C., and stoppered. The temperature was recorded at 30 minutes, 60 minutes, and every hour thereafter, until six hours had elapsed from the heating time. The results were compared with those using a vacuum insulated container, described above, which can be considered to be substantially identical to the invention in all respects except that container utilizes a glass vacuum liner for thermal insulation. The results of this test are disclosed in FIGS. 2a and 2b. As shown in FIGS. 2a and 2b, the PCTG employed exhibits a time/temperature profile which compares favorably with the vacuum insulated container tested and the container employing glyceryl monostearate.

Alternatively, the performance of the microwave container can be tested by filling the container to capacity with water at ambient temperature. The container is then placed in a 750 watt microwave oven and heated at full power for 4 to 6 minutes. The stopper is affixed, and the temperature is then recorded each hour for a total of six hours.

The preceding examples can be repeated with similar success by substituting the generically and specifically described constituents and/or operating conditions of this invention for those used in the preceding examples. From the foregoing descriptions, one skilled in the art can easily ascertain the essential characteristics of this invention, and without departing from the spirit and scope thereof, can make various changes and modifications of the invention to adapt it to various usages and conditions. In this regard, suitable methods in accordance with the invention as set forth above and in the appended claims may be readily practiced by those of ordinary skill in the art based on the teachings of the present specification. Thus, in view of the teachings above, it will be apparent that one of ordinary skill in the art can employ the microwaveable containers of the invention to practice various methods of heating food and/or maintaining food warm. For example, a cold (refrigerated) or room-temperature food could be warmed by heating a microwaveable container of the invention such as a serving container, and then placing the food in the container or in heat exchange relationship with the heat storage mass therein to be warmed thereby. Such methods have particular utility in warming and serving foods to sensitive individuals, such as, for example serving baby foods to infants or similar individuals, such as patients in nursing homes, hospitals or other institutional settings.

Additionally, containers of the invention including plate-shaped containers (such as heat storage "pellets") and/or trays could be used in food service methods in institutional settings such as those methods disclosed in U.S. Pat. No. 5,603,858 to WYATT et al., which patent is hereby incorporated by reference for such teachings as though set forth in full herein. Such methods could also be practiced and applied in food delivery, such as in home delivery of restaurant food, including pizza, Chinese food, etc.

What is claimed is:

1. A microwaveable heat retentive container comprising at least one portion for receiving a material; and
   a heat storage mass comprising a microwave absorbing material in heat exchange communication with said at least one portion, said microwave absorbing material comprising at least one polymeric resin having a melting point of at least 400° F., said polymeric resin comprising repeating units having at least one of nitrogen, oxygen, and sulfur atom.

2. The microwaveable heat retentive container of claim 1, wherein the polymeric resin comprises at least one member selected from polyacetals, polyacetates, cellulosics, nylons, polyamides, polyimines, polyesters, polyethers, polysulfones, and copolymers thereof.

3. The microwaveable heat retentive container of claim 2, wherein the microwave absorbing material comprises polyester.

4. The microwaveable heat retentive container of claim 3, wherein the polyester comprises a member selected from polyalkyl esters, polyaryl esters, and copolymers thereof.

5. The microwaveable heat retentive container of claim 4, wherein the polyester comprises a compound having the following formula:

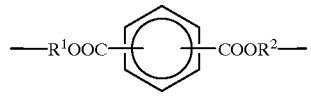

wherein $R^1$ and $R^2$, which may be the same or different, is each independently selected from a single bond; $C_6$–$C_{12}$ cycloalkyl; $C_2$–$C_{20}$ alkyl; $C_2$–$C_{20}$ alkyl containing 1–5, nitrogen, oxygen or sulfur substituent(s); $C_2$–$C_{20}$ alkenyl with from 1–5 double bonds; or —$R^3R^4R^5$—, wherein $R^4$ is $C_6$–$C_{12}$ cycloalkyl and $R^3$ and $R^5$ are each independently selected from a single bond, $C_1$–$C_{20}$ alkyl or $C_2$–$C_{20}$ alkenyl.

6. The microwaveable heat retentive container of claim 5, wherein $R^1$ is a single bond and $R^2$ is selected from $C_2$–$C_4$ alkyl, and —$R^3$—$R^4$—$R^5$— wherein $R^4$ is cyclohexyl and $R^3$ and $R^5$ are each —$CH_2$—.

7. The microwaveable heat retentive container of claim 5, wherein $R^1$ is a single bond, and $R^2$ is selected from —$CH_2$—, —$CH_4$—, or —$R^3R^4R^5$—, wherein $R^4$ is $C_6$–$C_{12}$ cycloalkyl and $R^3$ and $R^5$ is each —$CH_2$—.

8. The microwaveable heat retentive container of claim 5, wherein the polyester comprises a member selected from polyalkylene terephthalate, polybutylene terephthalate, polycyclohexamethylene terephthalate, PETG, PCTG, PCTA, and copolymers thereof.

9. The microwaveable heat retentive container of claim 8, wherein the polyester comprises PCTG.

10. The microwaveable heat retentive container of claim 8, wherein the polyester comprises PETG.

11. The microwaveable heat retentive container of claim 1, wherein said microwave absorbing material is disposed within a microwave absorbing material storage volume.

12. The microwaveable heat retentive container of claim 11, wherein said microwave absorbing material storage volume comprises a substantially tubular portion.

13. The microwaveable heat retentive container of claim 11, wherein said microwave absorbing material storage volume comprises a substantially annular portion.

14. The microwaveable heat retentive container of claim 11, wherein the microwave absorbing material storage volume comprises a pouch.

15. The microwaveable heat retentive container of claim 14, wherein said pouch is formed from a material comprising polypropylene.

16. The microwaveable heat retentive container of claim 1, wherein said container includes a bottom wall portion and said microwave absorbing material associated with said bottom wall portion.

17. The microwaveable heat retentive container of claim 16, wherein said bottom wall portion includes a cavity and said microwave absorbing material is disposed within said cavity.

18. The microwaveable heat retentive container of claim 14, wherein said container comprises
   (a) an inner shell forming a shape adapted to receive a food or beverage product, and
   (b) an outer shell associated with said inner shell and forming a cavity therebetween; and
   said pouch is disposed in said cavity.

19. The microwaveable heat retentive container of claim 18, wherein the microwave absorbing composition comprises PCTG.

20. The microwaveable heat retentive container of claim 18, wherein the cavity further comprises an insulating element to reduce outward radiant heat loss.

21. The microwaveable heat retentive container of claim 20, wherein the insulating element comprises insulating foam material.

22. The microwaveable heat retentive container of claim 21, wherein the insulating foam material comprises polyurethane foam.

23. A microwaveable heat retentive container for heated foods or beverages, comprising
    (a) an outer shell,
    (b) an inner wall within said outer shell, and
    (c) a material susceptible to heating by microwave radiation, said material having a time/temperature profile such that, when from approximately 50–120 grams of said material is subjected to microwave radiation having a frequency of from approximately 2,300–2,600 MHZ, at a power of from approximately 600–1,000 W, for a period of approximately 1¼–2½ minutes, said material is heated to a temperature in a range of approximately 170–325° F.

24. The microwaveable heat retentive container of claim 23, wherein said inner wall of (b) defines a receiving portion having a volume for receiving a material, and wherein the ratio of the mass, in grams, of said material susceptible to microwave radiation, to the volume of the receiving portion, in milliliters, is from about 1:5 to about 1:12.

25. The microwaveable heat retentive container of claim 24, wherein the ratio is from about 1:5 to about 1:10.

26. The microwaveable heat retentive container of claim 25, wherein the ratio is from about 1:6 to about 1:8.

27. The microwaveable heat retentive container of claim 23, wherein the outer shell is substantially microwave transparent.

28. The microwaveable heat retentive container of claim 23, wherein the outer shell comprises polypropylene.

29. The microwaveable heat retentive container of claim 23, wherein said material susceptible to heating by microwave radiation is contained within a pouch.

30. The microwaveable heat retentive container of claim 23, wherein the inner shell is substantially microwave transparent.

31. The microwaveable heat retentive container of claim 23, wherein the inner shell comprises polypropylene.

32. A method of providing a heated product to a consumer or user, comprising
    (a) placing a microwaveable container in a microwave oven, said container comprising a material susceptible to heating by microwave radiation, said material having a time/temperature profile such that, when from approximately 20–120 grams of said material is subjected to microwave radiation having a frequency of from approximately 2,300–2,600 MHZ, at a power of from approximately 600–1,000 W, for a period of approximately 1¼–2½ minutes, is heated to a temperature in the range of approximately 175° F.–325° F.;
    (b) adding heated product to said container, either prior or subsequent to (a); and
    (c) providing said container with heated product to a consumer or user.

33. A pouch having disposed therein a microwave absorbing material comprising polymeric acetal, acetate, cellulosic, nylon, amide, imine, ester, ether, sulfone, and/or combinations thereof.

34. The pouch of claim 33, wherein the microwave absorbing material comprises polyester.

35. The pouch of claim 34, wherein the microwave absorbing material comprises a compound having the following formula:

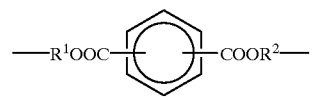

wherein $R^1$ and $R^2$, which may be the same or different, is each independently selected from a single bond; $C_6$–$C_{12}$ cycloalkyl; $C_2$–$C_{20}$ alkyl; $C_2$–$C_{20}$ alkyl containing 1–5 nitrogen, oxygen or sulfur substituent(s); $C_2$–$C_{20}$ alkenyl with from 1–5 double bonds; or —$R^3R^4R^5$—, wherein $R^4$ is $C_6$–$C_{12}$ cycloalkyl and $R^3$ and $R^5$ are each independently selected from a single bond, $C_1$–$C_{20}$ alkyl or $C_2$–$C_{20}$ alkenyl.

36. The pouch of claim 35, wherein $R^1$ is a single bond and $R^2$ is preferably selected from $C_2$–$C_4$ alkyl, and —$R^3$—$R^4$—$R^5$— wherein $R^4$ is cyclohexyl and $R^3$ and $R^5$ are each —$CH_2$—.

37. The pouch of claim 36, wherein $R^1$ is a single bond, and $R^2$ is selected from —$CH_2$—, —$CH_4$— and or —$R^3R^4R^5$—, wherein $R^4$ is $C_6$–$C_{12}$ cycloalkyl and $R^3$ and $R^5$ is each —$CH_2$—.

38. The pouch of claim 37, wherein the microwave absorbing material comprises a member selected from polybutylene terephthalate, polycyclohexamethylene terephthalate, PETG, PCTG, PCTA, and combinations and/or copolymers thereof.

39. The pouch of claim 38, wherein the microwave absorbing material comprises PCTG.

40. The pouch of claim 38, wherein the microwave absorbing material comprises PETG.

41. In combination, the pouch of claim 36 and a microwaveable container.

* * * * *